(12) United States Patent
Padmanabh et al.

(10) Patent No.: US 8,743,198 B2
(45) Date of Patent: Jun. 3, 2014

(54) METHOD AND SYSTEM FOR REAL TIME DETECTION OF CONFERENCE ROOM OCCUPANCY

(75) Inventors: Kumar Padmanabh, Uttar Pradesh (IN); Sanjoy Paul, Karnataka (IN)

(73) Assignee: Infosys Limited (IN)

( * ) Notice: Subject to any disclaimer, the term of this patent is extended or adjusted under 35 U.S.C. 154(b) by 686 days.

(21) Appl. No.: 12/714,901

(22) Filed: Mar. 1, 2010

(65) Prior Publication Data

US 2011/0157366 A1 Jun. 30, 2011

(30) Foreign Application Priority Data

Dec. 30, 2009 (IN) .............................. 3231/CHE/2009

(51) Int. Cl.
*G08B 13/196* (2006.01)
*G08B 5/22* (2006.01)

(52) U.S. Cl.
CPC .................................. *G08B 13/196* (2013.01); *G08B 5/221* (2013.01)
USPC ........... 348/143; 348/152; 348/155; 348/154; 348/169

(58) Field of Classification Search
CPC ... G08B 5/221; G08B 13/1481; G08B 13/196
See application file for complete search history.

(56) References Cited

U.S. PATENT DOCUMENTS

| | | | |
|---|---|---|---|
| 5,189,393 A * | 2/1993 | Hu | 340/522 |
| 5,394,035 A * | 2/1995 | Elwell | 327/72 |
| 6,614,450 B1 | 9/2003 | Vossler | |
| 6,841,945 B1 * | 1/2005 | Elwell | 315/154 |
| 7,358,985 B2 | 4/2008 | Uchihashi et al. | |
| 7,411,489 B1 * | 8/2008 | Elwell et al. | 340/501 |
| 7,554,437 B2 | 6/2009 | Axelsen | |
| 7,746,379 B2 * | 6/2010 | Jesson et al. | 348/161 |
| 7,777,632 B2 * | 8/2010 | Elwell | 340/573.1 |
| 7,952,474 B2 * | 5/2011 | Kang et al. | 340/522 |
| 8,040,245 B2 * | 10/2011 | Koblasz | 340/573.1 |
| 8,081,073 B2 * | 12/2011 | Reibel et al. | 340/541 |
| 8,325,230 B1 * | 12/2012 | Pattikonda et al. | 348/143 |
| 2002/0175815 A1 * | 11/2002 | Baldwin | 340/567 |
| 2003/0078905 A1 * | 4/2003 | Haugli et al. | 707/1 |
| 2004/0066500 A1 * | 4/2004 | Gokturk et al. | 356/4.01 |
| 2006/0198441 A1 * | 9/2006 | Chi | 375/240.16 |
| 2007/0061192 A1 * | 3/2007 | Chew | 705/13 |
| 2007/0162315 A1 | 7/2007 | Hodges | |
| 2007/0285510 A1 | 12/2007 | Lipton et al. | |
| 2007/0285511 A1 * | 12/2007 | Shafer et al. | 348/143 |
| 2009/0033504 A1 * | 2/2009 | Tsai et al. | 340/584 |
| 2010/0123579 A1 * | 5/2010 | Midkiff | 340/541 |

* cited by examiner

*Primary Examiner* — Sath V Perungavoor
*Assistant Examiner* — Matthew J Anderson
(74) *Attorney, Agent, or Firm* — Cantor Colburn LLP (57) ABSTRACT

A method for detecting occupancy status of a plurality of conference rooms in real time is provided. The method enables, firstly, monitoring a first output signal of a first sensor. Secondly, the method enables monitoring a second output signal of a second sensor. The method further enables comparing the first and second output signals with one or more predetermined thresholds within a predetermined time. Furthermore, the method enables correlating the comparison results to identify any uncertainty in detecting the occupancy. Furthermore, the method enables processing output from one or more image and/or video sensors based on the correlation to obtain occupancy status information when there is uncertainty in detecting occupancy. Finally, the method enables displaying the occupancy status information on one or more user devices.

21 Claims, 6 Drawing Sheets

| Distance | Light (Lux) | | Temperature (degrees centigrade) | |
| --- | --- | --- | --- | --- |
| | ON | OFF | AC ON | AC OFF |
| < 1 meter | 612 | 90 | 24 | 31 |
| 1-2 meter | 452 | 90 | 24 | 31 |
| 2-3 meter | 398 | 90 | 24 | 31 |
| 3-4 meter | 350 | 90 | 24 | 31 |
| 4-5 meter | 339 | 90 | 24 | 31 |
| 5-6 meter | 331 | 90 | 24 | 31 |
| 6-7 meter | 327 | 90 | 24 | 31 |
| Threshold | 327 | | 26 | |

Table 1

METHOD AND SYSTEM FOR REAL TIME DETECTION OF CONFERENCE ROOM OCCUPANCY

FIELD OF THE INVENTION

The present invention relates generally to conference room management system and more specifically to a system and method for detecting occupancy of conference room in real time using a combination of wireless sensor devices and image and/or video sensors.

BACKGROUND OF THE INVENTION

Conference rooms in various organizations are booked by one or more users for meetings and teleconferences. Conventionally, booking and scheduling of a conference room in an organization is carried out using Personal Information Managers, such as, but not limited to, a Microsoft Outlook, Infoselect, Meeting Maker etc. Further, a user typically checks availability of conference rooms using a personal information manager application on his personal computer for reserving a conference room for a stipulated day and duration as per requirement.

Generally, the actual duration of meetings cannot be ascertained and hence is not the same as that displayed by the Personal Information Manager. This is because in case of cancellation of meeting, the cancelled status may not be updated in the Personal Information Manager. The conference room may, therefore, be left unutilized and another user may be deprived of using the conference room. In addition, in the event meeting is over before or after scheduled time, the status may not be updated in the Personal Information Manager. In such scenarios, the conference rooms may not be utilized or there may be a conflict between meetings and other users. Moreover, electrical appliances, such as, lights and air-conditioner may be switched on when the conference room is not occupied. The conference rooms are, therefore, not optimally utilized. Further, during the unused time period, electricity in the conference room may be wasted in powering the lights and air conditioning system thereby contributing to unnecessary cost and wastage of electricity.

Conventionally, sensors are used to obtain occupancy status information by monitoring motion or movement in the conference room. The occupancy status information is, then processed and updated in an application server. However, detection of occupancy by, for example, movement or motion sensors may not be accurate. The movement sensors may not be able to detect occupancy when movement in the conference room is limited or nil. Further, acoustic sensors may also fail to detect occupancy in a conference room, if decibel level in the conference room is low. In such scenarios, there is uncertainty in detecting occupancy of the conference room which results in the accuracy level of occupancy detection to be sub-optimal. Further, usage of only image capturing devices, such as, camera, for detecting occupancy of a conference room and updating an application server is computationally complex and expensive.

In light of the abovementioned disadvantages, there is a need for a system and method that can efficiently detect occupancy of multiple conference rooms in real time for optimal conference room management. Also, there is a need for a cost effective system and method that can accurately detect occupancy of a conference room and update an application server with the occupancy status. In addition, there is a need for a system and method that can use combination of various sensors and image and/or video sensors for accurate detection of occupancy status. Further, there is a need of a system and method that facilitates automated switching (on or off) electrical appliances in the conference room based on the occupancy status detection for optimal electricity consumption.

SUMMARY OF THE INVENTION

A method for detecting occupancy status of a plurality of conference rooms in real time is provided. The method comprises, firstly, monitoring a first output signal of a first sensor. Secondly, the method comprises monitoring a second output signal of a second sensor. The method further comprises comparing the first and second output signals with one or more predetermined thresholds within a predetermined time. Furthermore, the method comprises correlating the comparison results to determine any uncertainty in detecting the occupancy. The method comprises processing output from one or more image and/or video sensors based on the correlation to obtain occupancy status information if any uncertainty is determined. Finally, the method comprises displaying the occupancy status information on one or more user devices.

In an embodiment of the present invention, the first and second output signals comprise voltage signals. In another embodiment of the present invention, monitoring, comparing, correlating and processing is performed by a processing module. In an alternate embodiment of the present invention monitoring, comparing, correlating and processing is performed by a centralized application server.

In another embodiment of the present invention, comparing the first and second output signals with one or more predetermined thresholds within a predetermined time comprises, firstly, determining if the first and second output signals exceed a first predetermined threshold. Secondly, the method comprises determining, when the first and second signals exceed the first predetermined threshold, if the first and second output signals exceed a second predetermined threshold or if the first and signal output signals are below a third predetermined threshold.

In an embodiment of the present invention, comparing the first and second output signals with one or more predetermined thresholds within a predetermined time comprises, firstly, assigning a first value if the first and second output signal exceeds the second predetermined threshold. Secondly, assigning a second value if the first and second output signals are below the third predetermined threshold and finally assigning a third value if the first and second output signals neither exceed the second predetermined threshold nor are below the third predetermined threshold.

In an embodiment of the present invention, the predetermined time comprises at least one of: 5 minutes, 10 minutes and 15 minutes. In an embodiment of the present invention, correlating the comparison results to determine occupancy comprises determining if the first value and second value are identical and are non zero. In another embodiment of the present invention, correlating the comparison results to determine any uncertainty in detecting the occupancy comprises determining if the values assigned to both first and second sensors are a combination of first or second or third value. The combination indicates uncertainty in detecting occupancy status. In an embodiment of the present invention, the first sensor is a movement sensor. In an embodiment of the present invention, the second sensor is an acoustic sensor.

In an embodiment of the present invention, processing output from the one or more image and/or video sensors based on the correlation to obtain occupancy status information comprises, firstly, determining a base picture, wherein the base picture represents picture of an empty conference room. Secondly, determining an uncertain picture, wherein the uncertain picture represents picture of the conference room when both the first and second output signals neither exceed the second predetermined threshold nor are below the third predetermined threshold. Further, the method comprises computing difference between the uncertain picture and base picture.

Furthermore, the method comprises analyzing the computed difference for detecting presence of one or more users in the conference room to obtain occupancy status information.

In an embodiment of the present invention, the method further comprises transmitting the occupancy status information by the processing module to a centralized application server for displaying the occupancy status information on the one or more user devices. In another embodiment of the present invention, the method further comprises, firstly, monitoring output signals of light and temperature sensor and secondly, comparing the output signals with corresponding predetermined thresholds to determine if the light and air-conditioner are switched 'on' or 'off'.

A method for detecting occupancy status of a plurality of conference rooms in real time is provided. The method comprises, firstly, monitoring a first output signal of a movement sensor. Secondly, the method comprises monitoring a second output signal of an acoustic sensor. The method further comprises comparing the first and second output signals with one or more predetermined thresholds within a predetermined time. Furthermore, the method comprises correlating the comparison results to determine any uncertainty in detecting the occupancy. The method comprises processing output from one or more image and/or video sensors based on the correlation to obtain occupancy status information if any uncertainty is determined. Finally, the method comprises displaying the occupancy status information on one or more user devices.

A system of detecting occupancy status of a plurality of conference rooms is provided. The system comprises a processing module configured to determine occupancy status information, wherein the processing module facilitates, firstly, monitoring output signals of one or more sensor devices located in each of the plurality of conference rooms and further configured to compare the output signals with one or more predetermined thresholds within a predetermined time. Secondly, the system comprises monitoring output from one or more image and/or video sensors located in each of the conference rooms when an uncertainty of occupancy status detection is determined after correlation of the comparison results. The system further comprises a centralized application server in communication with the processing module over a data communication network configured to receive the occupancy status information and update the occupancy status information for displaying on one or more user devices.

In an embodiment of the present invention, the system further comprises a coordinator node configured to transmit output signals of the one or more sensor devices to the processing module and further configured to transmit video output from the one or more image and/or video sensors to the processing module. In another embodiment of the present invention, the one or more sensor devices comprise at least one of: movement sensor and acoustic sensor. In another embodiment of the present invention, the one or more image and/or video sensors comprise at least one of camera and any other video processing device. In an embodiment of the present invention, the system further comprises at least one of: light sensor and temperature sensor. In another embodiment of the present invention, the one or more user devices comprise remote computing devices communicatively coupled to the centralized application server. In an embodiment of the present invention, the data communication network comprises any one of: local area network, wide area network, metropolitan area network and wireless data communication network.

The present invention is described by way of embodiments illustrated in the accompanying drawings wherein.

BRIEF DESCRIPTION OF THE
ACCOMPANYING DRAWINGS

DETAILED DESCRIPTION OF THE INVENTION

A method and system for detecting occupancy status of a conference room in real time to schedule conference room management is described herein. The invention facilitates booking of a conference room by a user based on optimal detection of occupancy status of the conference room. Further, the invention enables detecting occupancy status using a combination of two disparate systems i.e. sensor devices and image and/or video sensors to accurately detect the presence or absence of users in the conference room and updating the occupancy status in a centralized application server. Specifically, the invention provides for usage of acoustic sensor and movement sensor in combination with image processing of video from a camera. The invention, therefore, facilitates to determine difference between actual meeting time in the conference room vis-à-vis that displayed by the centralized application server. The invention further facilitates controlling the on/off state of the electrical appliances in the conference room based on the detected occupancy status.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
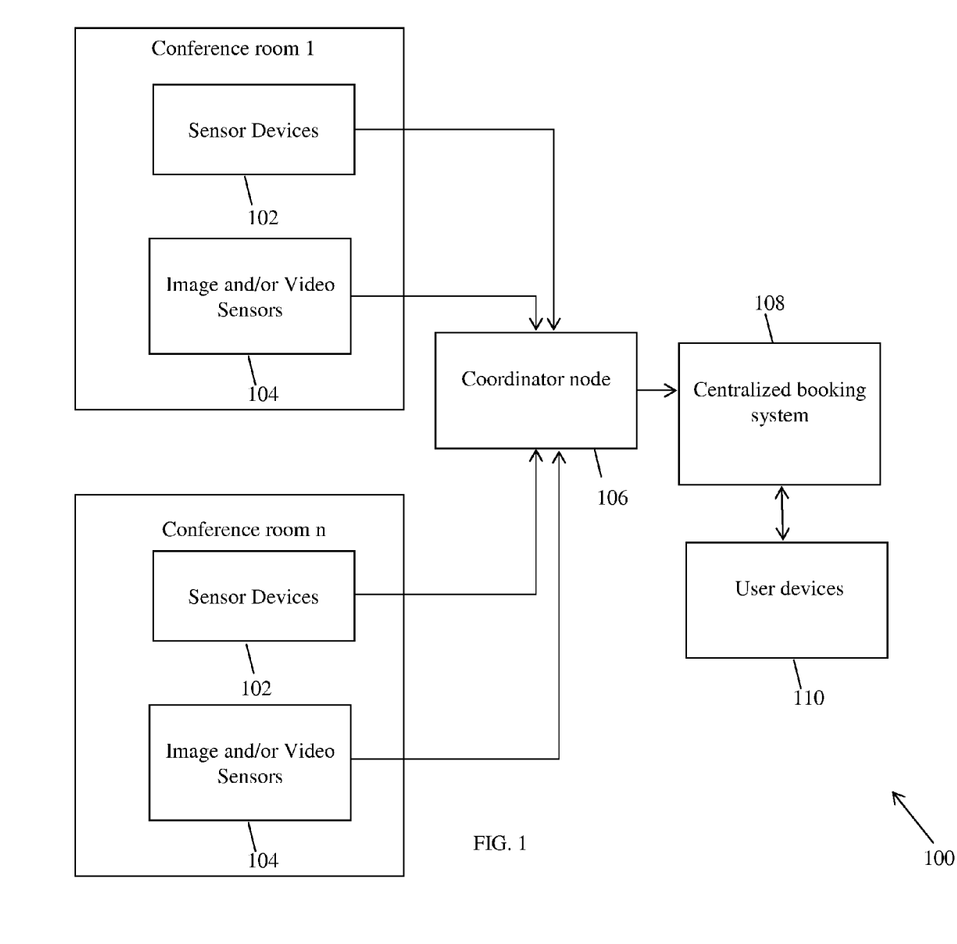
FIG. 1 is a block diagram of a system for detecting occupancy status of a conference room in accordance with an embodiment of the present invention.

FIG. 1 is a block diagram of a system 100 for detecting occupancy status of a conference room in real time in accordance with an embodiment of the present invention. As shown in FIG. 1, various conference rooms (e.g. conference room 1 to conference room n) may be located in different floors of an organization or in different buildings across the campus of the organization. The system 100 facilitates users to book a conference room from amongst the various conference rooms. The system 100 facilitates monitoring each of the conference rooms, collecting the occupancy status information and updating a centralized software system which displays the actual occupancy status of the conference room to the users.

In various embodiments of the present invention, the system 100 comprises sensor devices 102, image and/or video sensors 104, a coordinator node 106, a centralized booking system 108 and user devices 110.

The sensor devices 102 are electronic or electromechanical devices which facilitates measuring physical or environmental information and converting the information into a signal which can be read by an equipment. In various embodiments of the present invention, the sensor devices 102 may be integrated with a wireless transceiver, a microcontroller and a battery for power supply thus forming a wireless sensor node (not shown). An example of the wireless transceiver may include ADF7020-1 transceiver chip which operates at 868 MHz. Example of microcontroller may include PIC 18F4550. The wireless node forms a mesh network which transmits data generated by the sensor devices 102 to a desired location. In an embodiment of the present invention, the transmission range of the wireless sensor node may be of the order of 100 meters. In an embodiment of the present invention, multiple numbers of the wireless sensor nodes may be placed in the conference room and an additional repeater may be placed in between to form a full mesh network.

The sensor devices 102 comprise wireless sensors for detecting presence or absence of users and the ambient parameters of the conference room. In an embodiment of the present invention, the wireless sensors for detecting presence or absence of users include an acoustic sensor and a movement sensor. In another embodiment of the present invention, the wireless sensors for detecting ambient parameters include a temperature sensor and a light sensor. In an embodiment of the present invention, the acoustic sensor may be a microphone. The output signal of the acoustic sensor provides decibel level of the conference room which facilitates to determine the presence or absence of users in the conference room. In an embodiment of the present invention, the output signal of the acoustic sensor depends upon the distance of speakers in the conference room from the acoustic sensor and decays exponentially with increase in distance between the acoustic sensor and the speakers.

In an embodiment of the present invention, the movement sensor may include a Passive Infrared (PIR) sensor. The movement sensor facilitates detecting movement or motion of users in the conference room. An example of PIR sensor is DigiPyro which detects movement within 10 meters. The PIR sensor produces output signal voltage which is proportional to the amount of movement of users in the conference room. The output signal from movement and decibel sensors are used to detect whether meeting is in progress or not.

The sensor devices 102 also comprises light and temperature sensors for monitoring the ambient parameters i.e. luminance and temperature. The state of the electrical appliances in the conference room i.e. light source and Air Conditioner (AC) are determined based on the luminance value and temperature value determined by light and temperature sensors. In various embodiments of the present invention, the PIR sensor may be connected to an external digital channel of the wireless sensor node and microphone may be connected to an external analog channel of the wireless node. The light and temperature sensors may be mounted on a board in the wireless sensor node.

The image and/or video sensors 104 are electronic devices which are used to capture still or moving images in the conference room. In various embodiments of the present invention, the image and/or video sensors 104 may be low cost camera or any other mechanism for recording pictures of the conference room.

Coordinator node 106 is a network node equipped for interfacing with another node. In various embodiments of the present invention, coordinator node 106 is a gateway which collects the output signals from the sensor devices 102 and the image and/or video sensors 104. The coordinator node 106, then, transmits the output signals to the centralized booking system 108. In an embodiment of the present invention, the coordinator node 106 may be present on each floor of the organization. The coordinator nodes 106 on each floor are connected to each other in a complete mesh network topology. In various embodiments of the present invention, each building has a gateway which is a coordinator node 106 connected to a Personal Computer (PC). The coordinator node 106 collects the output signals from the sensor devices 102 and transmits the output signals to the centralized booking system 108.

In various embodiments of the present invention, the centralized booking system 108 is configured to facilitate users to create a request for booking a conference room on a particular day and time slot using an application software installed in the user's computing device. The centralized booking system 108 is further configured to receive output signals from sensor devices 102 via the coordinator node 106. The output signals received are, then, processed to detect presence or absence of users in the conference room to determine if a meeting is in progress in the conference room. Further, the coordinator node 106 is configured to receive and process output signals from the image and/or video sensors 104 when it is determined that there is uncertainty of detection of presence or absence of users in the conference room using the sensor devices 102. The centralized booking system 108 is further configured to receive information relating to the state of the electrical appliances from the sensor devices 102 to determine if the electrical appliances are switched on when the conference room is not occupied. The information obtained is updated in the centralized booking system 108 and made available to all the users through the application software installed in the users computing devices. The users are, thus, informed on the actual occupancy status of the conference room he desires to book to prevent any conflict between meetings and users of the conference room.

The user devices 110 are computing devices which may be used by users to access personal information managers in the computing devices. Examples of computing devices may be Personal Computer (PC), PDA (Personal Digital Assistant), Blackberry, portable computers, laptops etc.

Figure 2:
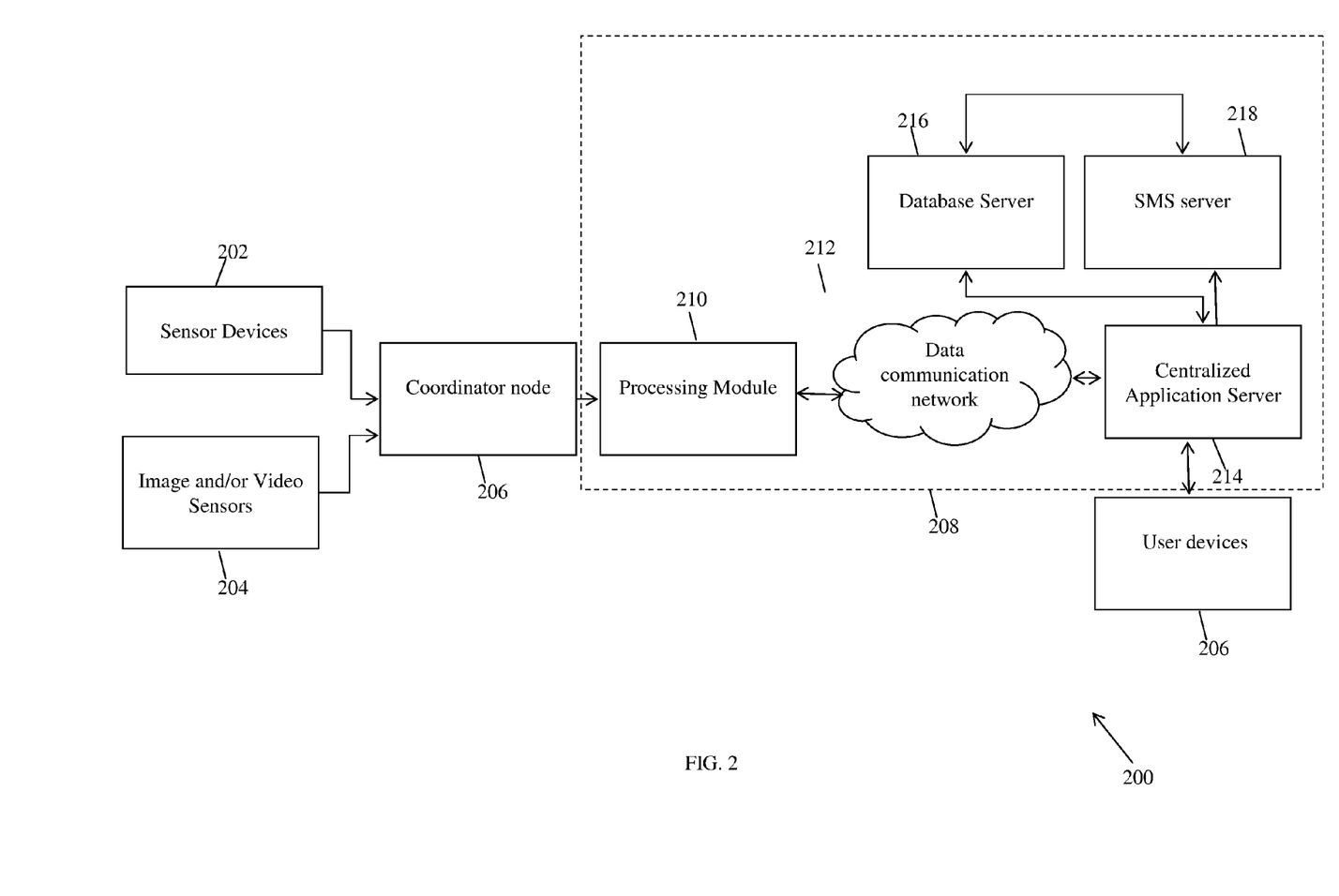
FIG. 2 is a detailed block diagram of a centralized booking system.

FIG. 2 is a detailed block diagram of a centralized booking system. In various embodiments of the present invention, the centralized booking system 208 comprises a processing module 210, a centralized application server 214, a database server 216, a Short Messaging Service (SMS) server 218. In an embodiment of the present invention, the processing module 210 communicates with the centralized application server 214 over a data communication network 212.

The processing module 210 is an electronic device which comprises program modules to process output signals received from the sensor devices 202 and image and/or video sensors 204 via the coordinator node 206. The processing module 210 processes the output analog voltage signal from the sensor devices 202 to obtain occupancy status information detected by the movement and acoustic sensors. In various embodiments of the present invention, the processing module 210 monitors the output analog voltage signal of the microphone and PIR sensor and checks the number of times the output voltage crosses one or more predetermined thresholds in a predetermined time. In an embodiment of the present invention, a first predetermined threshold is chosen based on parameters, such as, type, make and usage of the movement or acoustic sensor and a maximum output voltage of the movement or acoustic sensors. In an embodiment of the present invention, it is checked if the output voltage exceeds the first predetermined threshold. In another embodiment of the present invention, if the number of times that the output voltage crosses the first predetermined threshold is ascertained to have exceeded a second predetermined threshold within a predetermined time, a value 2 is assigned which indicates that the conference room is occupied. In another embodiment of the present invention, if the number of times that the output voltage crosses the first predetermined threshold is ascertained to be below a third predetermined threshold within a predetermined time, a value 0 is assigned which indicates that the conference room is not occupied. In another embodiment of the present invention, if the output voltage is neither greater than the second predetermined threshold or below the third predetermined threshold, a value 1 is assigned which indicates that there is an uncertainty in detecting presence or absence of users in the conference room.

In another embodiment of the present invention, the processing module 210 processes the output analog voltage signal from light and temperature sensors to determine if the light and temperature sources are switched 'on' or 'off'. In an embodiment of the present invention, instantaneous values of light and temperature sensors are monitored to check if the luminance and temperature values exceed a predetermined threshold. The predetermined threshold is determined by measuring luminance and temperature values when the light and temperature sensors are at various distances from the light and temperature source, such as, tube light and an Air Conditioner (AC). The predetermined threshold is determined by measuring luminance and temperature value when light source and AC are switched 'on' and 'off'. The processing module 210, after processing the information from the light and temperature sensor, may send a signal to the sensor devices 202. In an embodiment of the present invention, the sensor devices 202 may be connected to an actuation circuitry (not shown) to turn off a relay controlling the ON-OFF switch for lights and AC. In an embodiment of the present invention, the sensor devices 202 may be co-located with the light and AC switch. In another embodiment of the present invention, the sensor devices 202 may be separately connected to the actuator for controlling the relay for AC and the ON-OFF switch for the lights.

In an embodiment of the present invention, the processing module 210 facilitates transmitting the occupancy information and state of the electrical appliances forming a payload comprising of temperature value, luminance value, movement sensor and acoustic sensor values of two bytes each, making the net payload length of 8 bytes to the centralized application server 214.

In another embodiment of the present invention, the processing module 210 receives and processes output from the image and/or video sensors 204 to determine the occupancy information if there is an uncertainty of detection of occupancy using the sensor devices 202 as mentioned above. The image and/or video output comprises of picture captured when the conference room is empty and picture of the conference room when the uncertainty is detected. The processing module 210 computes the difference between the two pictures and analyzes the computed difference using conventional image processing techniques used for detecting humans. In an embodiment of the present invention, the difference is compared with human profile information from a database. The processing module 210, therefore, facilitates accurate detection of presence or absence of users in the conference room. The image and/or video sensors 204 are, thus, used as an add-on rather than as the primary source of information.

The processing module 210 transmits the information to the centralized application server 214 over the data communication network 212, such as, Local Area Network (LAN), Wide Area Network (WAN), Metropolitan Area Network and any wireless data communication network.

The centralized application server 214 is an application software system that facilitates maintaining and displaying data related to conference room bookings in a corporate environment. The centralized application server 214 facilitates reflecting occupancy status in real time to the users via an application software in the computing devices of the users. Examples of application software includes, but not limited to, Microsoft Outlook, Infoselect, Meeting Maker etc.

In an alternate embodiment of the present invention, the centralized application server 214 is configured to monitor the output signals from the movement, acoustic and image and/or video sensors. The centralized application server 214 is further configured to detect if the conference room is occupied or not. In an embodiment of the present invention, the information in the centralized application server 214 is maintained in the database server 216.

In an embodiment of the present invention, the centralized application server 214 facilitates sending alerts in the form of email or SMS using the SMS server 218 to the user devices to switch off the lights or AC. In another embodiment of the present invention, the centralized application server 214, after processing the information from the light and temperature sensor, may send a signal to the sensor devices 202. The sensor devices 202 facilitate to switch off the electrical appliances automatically. This would prevent electricity wastage if the electrical appliances are detected to be operational even when the conference room is unoccupied.

In another embodiment of the present invention, the detection of occupancy status may take place in a distributed manner. The movement sensors, the acoustic sensors and the image and/or video sensors may exchange information among themselves to obtain occupancy status information.

Figure 3A:
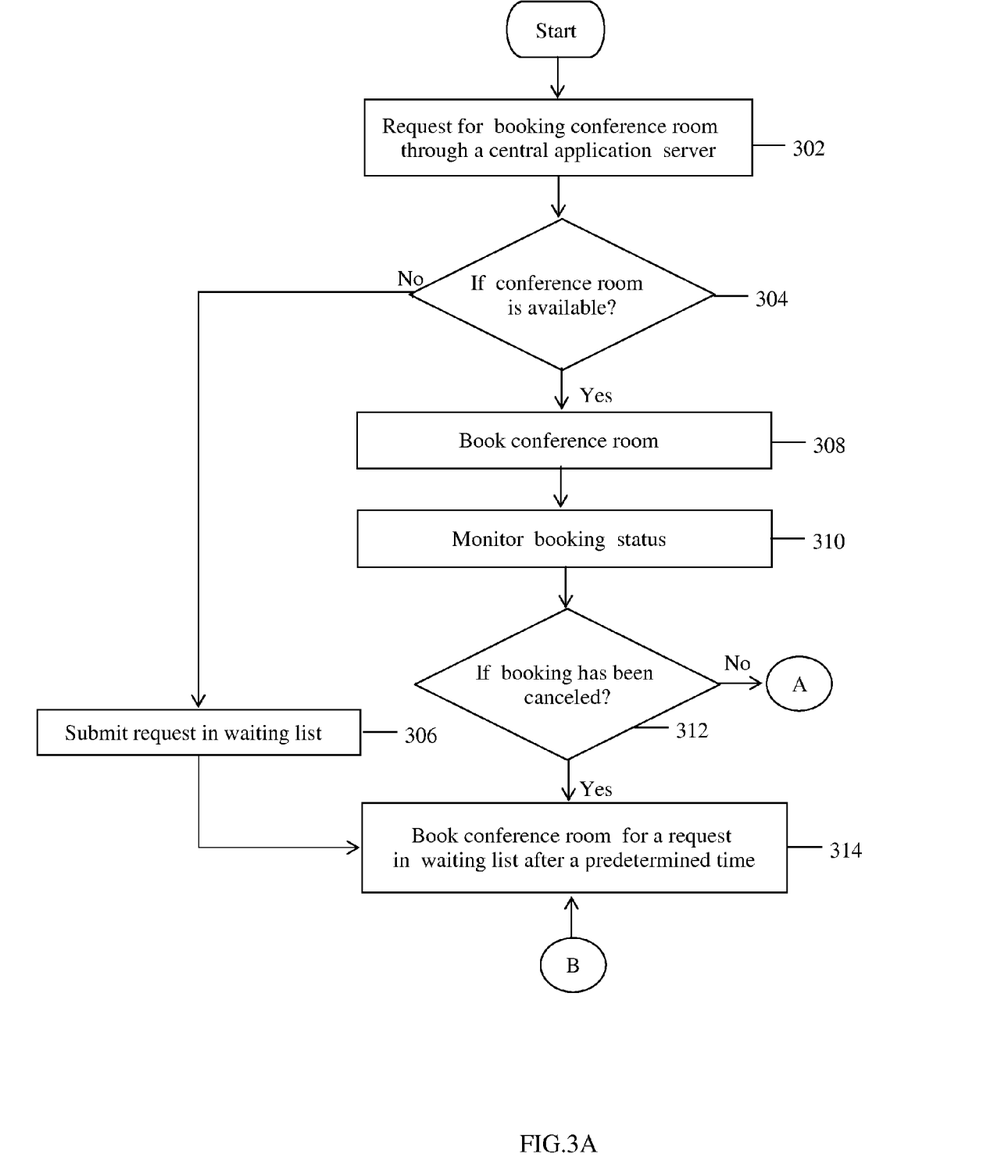
FIGS. 3A and 3B represent a flowchart illustrating a method for facilitating booking of a conference room based on detection of occupancy status of a conference room in real time in accordance with an embodiment of the present invention.
Figure 3B:
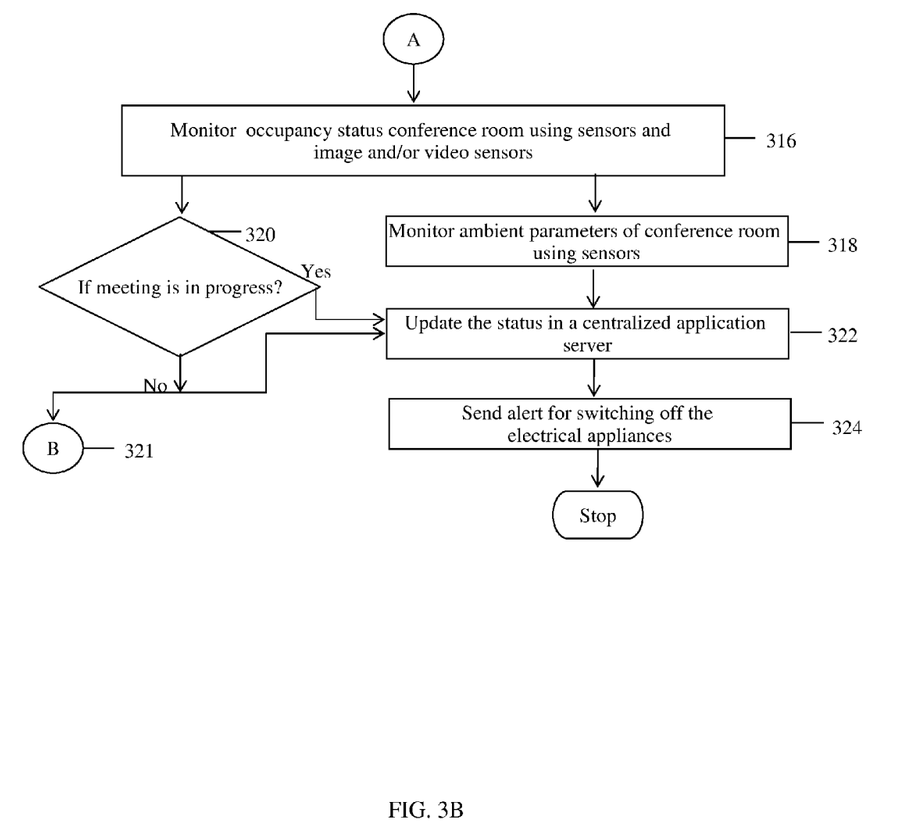

FIGS. 3A and 3B is a flowchart illustrating a method for facilitating booking of a conference room based on detection of occupancy status of a conference room in real time in accordance with an embodiment of the present invention.

At step 302, a request for booking a conference room is made through a centralized application server. In an embodiment of the present invention, a user creates a request for booking a conference room for a meeting for a particular day and duration using application software residing in a computing device of the user, such as, a Personal Computer (PC). The request gets processed through the centralized application server.

At step 304, a check is performed to determine if a conference room is available. In an embodiment of the present invention, it is checked if the conference room is not booked by any other user for the requested day and duration using the centralized application server. The checking may be performed by accessing a database maintaining booking status of conference rooms.

If it is determined that conference room is not available, then, at step 306, the request is submitted in a waiting list. In an embodiment of the present invention, if the conference room is identified to have been booked in advance, then, the user is prompted to submit his request in the waiting list.

If it is determined that conference room is available, then, at step 308, the conference room is booked. In an embodiment of the present invention, the conference room is booked for the particular day and duration using the centralized application server.

At step 310, booking status is monitored. At step 312, a check is performed to determine if booking has been canceled by the user. In an embodiment of the present invention, the booking status is continuously monitored using the centralized application server to check if the user has canceled his booking.

If it is determined that the booking has been canceled, then, at step 314, the conference room is booked for another user whose request is placed in the waiting list after a predetermined time. In an embodiment of the present invention, if booking is found to have been canceled by the user, an alert is sent through email and Short Messaging Service (SMS) to the user to rebook currently available conference room. If after a predetermined time, e.g. 60 minutes, the conference room is not rebooked, the conference room is booked for another user whose request is queued up in the waiting list.

If it is determined that booking has not been canceled, then, at step 316, occupancy status of a conference room is monitored using sensors and image and/or video sensors. In an embodiment of the present invention, during the scheduled time of the meeting, the occupancy status of the conference room is monitored using a combination of sensors and image and/or video sensors. The sensors may include movement and acoustic sensor which are used to detect presence or absence of users in the conference room. Further, if the signal output from the sensors do not facilitate detection of presence or absence of users in the conference room with a required level of certainty or degree of confidence, image and/or video output from image and/or video sensors are processed to detect presence or absence of users in the conference room. In an embodiment of the present invention, the image and/or video output comprises of picture of an empty conference room and picture of the conference room when there is uncertainty in detection of presence or absence of users in the conference room. The image and/or video output is, then, analyzed for presence or absence of users using conventional image processing techniques.

At step 318, ambient parameters are monitored. In an embodiment of the present invention, signal output from light and temperature sensors are monitored and processed. If the luminance value is greater than a predetermined threshold, light source in the conference room is considered to be switched on. In an embodiment of the present invention, the predetermined threshold may be 327 Lux. Similarly, if the temperature exceeds a predetermined threshold, the Air Conditioner (AC) in the conference room is considered to be switched on. In an embodiment of the present invention, the predetermined threshold may be 26 degrees centigrade.

Figure 4:
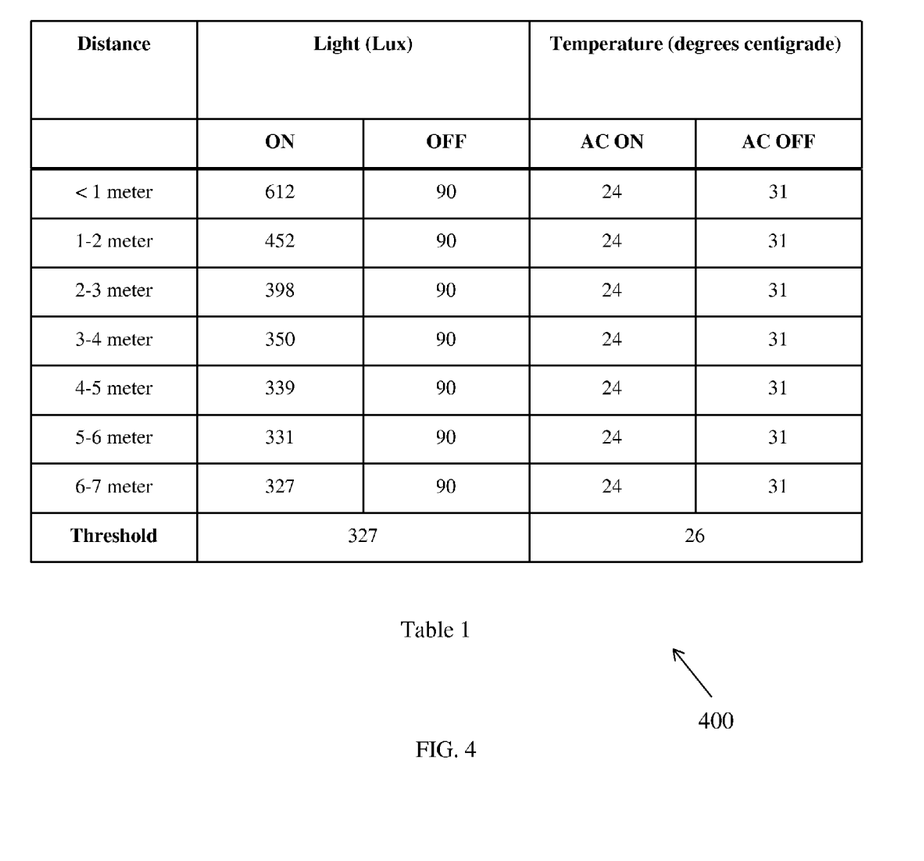
FIG. 4 is a table representing experimental data related to various luminous and temperature values monitored by light and temperature sensors with respect to their locations from light source and AC respectively in accordance with an exemplary embodiment of the present invention.

In various embodiments of the present invention, the predetermined threshold for light and temperature may be determined by monitoring luminance and temperature of the conference room due to the AC when the light and temperature sensors are placed at predetermined distances from the light source and AC. In an embodiment of the present invention, the luminance value may be calculated in absolute terms. Referring to FIG. 4 table 1 depicts experimental data related to various luminous and temperature values monitored by the light and temperature sensors with respect to their locations from the light source and AC respectively in accordance with an exemplary embodiment of the present invention. In the abovementioned embodiment, table 1 lists luminous and temperature values when both the light source and AC are switched on and off. The samples of the data have been taken after every 30 seconds. As illustrated in table 1, the predetermined threshold for determining the 'on' status of light source is 327 Lux and the predetermined threshold to determine the 'off' status of light is 90 Lux. The predetermined threshold to determine the 'on' status of AC is 26 degrees centigrade and the predetermined threshold to determine the 'off' status of AC is 31 degrees centigrade. The light source and AC are, therefore, considered to be in an on or off state if their corresponding values are above their respective thresholds. In an embodiment of the present invention, the 'on' condition of the electrical appliances i.e. light source and temperature are determined if at least at two instances the luminance and temperature values cross their respective thresholds.

At step 320, a check is performed to determine if a meeting is in progress. In an embodiment of the present invention, it is determined that meeting is in progress when the output from the movement and acoustic sensors or the image and/or video sensors indicates the presence of users in the conference room.

If it is determined that meeting is not in progress, then at step 321, a conference room is booked for another user whose request is queued up in the waiting list after a predetermined time. If the output from the movement and acoustic sensors or the image and/or video sensors indicates the absence of users in the conference room, then, the meeting is not in progress. The next request made by another user which is submitted in the waiting list is, then, serviced and the conference room is booked for another user.

At step 322, the meeting state and status of electrical appliance are updated in a centralized application server. In an embodiment of the present invention, the meeting state and state of the electrical appliances updated in a database which maintains information related to the conference room. The status information of the conference room is, then, available to all users accessing the application software from their computing devices.

If it is determined at steps 320 and 318 that meeting is not in progress and the electrical appliances are switched on, then, at step 324 an alert is sent to the user for switching off the electrical appliances. In an embodiment of the present invention, the alert may be sent by way of SMS or email to the user. In another embodiment of the present invention, the sensor devices may facilitate to automatically switch off the electrical appliances.

Figure 5:
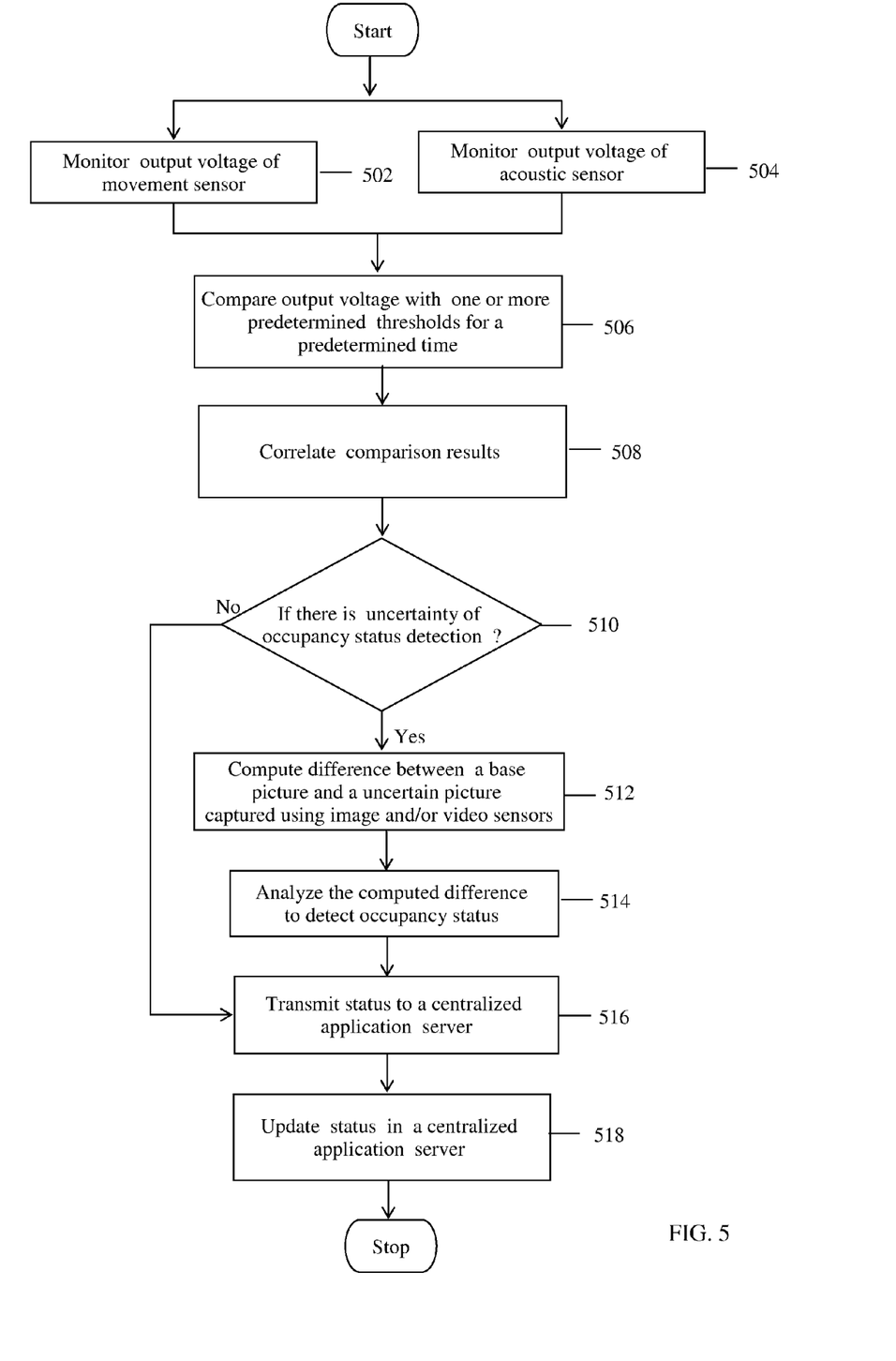
FIG. 5 is a detailed flowchart illustrating a method of detecting occupancy status of a conference room in real time using a combination of sensor devices output signal and output signal from image and/or video sensors in accordance with an embodiment of the present invention.

FIG. 5 is a detailed flowchart illustrating a method of detecting occupancy status of a conference room in real time using signal output from sensor devices and image and/or video sensors in accordance with an embodiment of the present invention.

At step 502, output voltage generated by a movement sensor is monitored. In an embodiment of the present invention, the occupancy status i.e. presence or absence of users is monitored using a movement sensor, such as, a Passive Infrared Sensor (PIR) sensor. A PIR sensor generates an analog voltage signal corresponding to motion or movement of users in the conference room. The output voltage typically fluctuates over a period of time indicating the amount of movement detected by the PIR sensor. For example, the output voltage of the PIR sensor may be monitored for 10 seconds to identify any fluctuation of the voltage signal.

At step 504, output voltage of acoustic sensor is monitored. In an embodiment of the present invention, acoustic sensors, such as, microphone may be used to detect decibel level or sound in the conference room. The voltage difference generated across the microphone is monitored after a predetermined time period, e.g. 30 seconds to detect presence or absence of users in the conference room.

At step 506, output voltage from movement and acoustic sensors is compared with one or more predetermined thresholds for a predetermined time respectively. In an exemplary embodiment, the predetermined threshold may be obtained from the equation: $T1 = \alpha * MAX$ output voltage, where T1 is the predetermined threshold and a is chosen based on the type and make of movement or acoustic sensor and the type of usage. If the output voltage of the movement sensor exceeds T1, it is considered a HIT (H). The output voltage is monitored for a predetermined time window for calculating the number of HITs. For example, the predetermined time may be 5 minutes, 15 minutes etc. In an exemplary embodiment of the present invention, if the number of HITs exceeds a second threshold T2 within the predetermined time, a first value e.g. 2 is assigned to the movement sensor. The value 2 signifies guaranteed presence of the user in the conference room. In another exemplary embodiment of the present invention, if number of HITs is below a third threshold T3, a second value, e.g. 0 is assigned to the movement sensor which signifies guaranteed absence of the user in the conference room. In an embodiment of the present invention, if the number of HITs neither exceeds T2 or T3 a third value, e.g. 1 is assigned to the movement sensor which signifies uncertainty in detection of either presence or absence of users. In an embodiment of the present invention, the above mentioned procedure is repeated for the acoustic sensor for the same predetermined time.

At step 508, the comparison results from movement and acoustic sensors are correlated. In an embodiment of the present invention, the values assigned to the movement and acoustic sensors are correlated to determine if the output signals from both the movement and acoustic sensors facilitate to determine a guaranteed presence or absence of the user. In an embodiment of the present invention, if both the movement and acoustic sensors are assigned a value 2, a guaranteed presence of the users is determined. In another embodiment of the present invention, if both the movement and acoustic sensors are assigned a value 0, a guaranteed absence of users is determined. In various embodiments of the present invention, the values from the movement sensor and acoustic sensor may be represented as tuple [x,x]. For example, values [2,2] from acoustic sensor and PIR sensor indicate that the conference room is occupied. Further, values [0,0] from acoustic sensor and PIR sensor indicates that the conference room is not occupied.

At step 510, a check is performed to determine if there is an uncertainty in detection of presence or absence of users in the conference room. In an embodiment of the present invention, if the values assigned to the movement and acoustic sensors are neither 2 nor 0, the detection is considered to be uncertain. In another embodiment of the present invention, if the values assigned to movement and acoustic sensors are 0 and 1 respectively, then, the detection is considered to be uncertain. In another embodiment of the present invention, if the values assigned to movement and acoustic sensors are 0 and 2 respectively, then, the detection is considered to be uncertain. In an embodiment of the present invention, if the values assigned to movement and acoustic sensors are 1 and 0 respectively, then, the detection is considered to be uncertain. In another embodiment of the present invention, if the values assigned to movement and acoustic sensors are 1 and 2 respectively, then, the detection is considered to be uncertain. In another embodiment of the present invention, if the values assigned to movement and acoustic sensors are 2 and 0 respectively, then, the detection is considered to be uncertain. In an embodiment of the present invention, if the values assigned to movement and acoustic sensors are 2 and 1 respectively, then, the detection is considered to be uncertain. For example, values [0,2], [0,1], [1,0], [1,2], [2,0] and [2,1] from the acoustic sensor and PIR sensor indicate that there is uncertainty in detecting presence or absence of user in the conference room.

At step 512, if it is determined that there is uncertainty in detection of presence or absence, difference between a base picture and uncertain picture is computed. In an embodiment of the present invention, image and/or video output from an image and/or video sensor, such as a, camera is used to determine a guaranteed presence or absence of user in the conference room in case of uncertainty in detection by the movement and acoustic sensors. In an embodiment of the present invention, the image and/or video output from the image and/or video sensor is processed by taking a base picture (BP) which is picture of a vacant conference room. Further, an uncertain picture (UP) is taken which is picture of the conference room when uncertainty of detection by movement and acoustic sensors is determined. In an exemplary embodiment of the present invention, the difference may be computed as $D = UP - BP$, where D denotes the computed difference.

At step 514, the computed difference is analyzed for the presence or absence of users using conventional image processing techniques. Then, at step 516, the occupancy status information is transmitted to the centralized application server in real time.

At step 510, if it is determined that there is no uncertainty in detection of occupancy status, then, at step, 516, the occupancy status information is transmitted to the centralized application server in real time.

At step 518, the occupancy status information as obtained in step 416 is updated in a centralized application server which is reflected to all the users through the application software residing in their computing devices.

The present invention may be implemented in numerous ways including as a apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for detecting occupancy status of a plurality of conference rooms in real time, the method comprising the steps of:
   monitoring a first output signal of a first sensor;
   monitoring a second output signal of a second sensor;
   comparing the first output signal generated by the first sensor and the second output signals generated by the second sensor with one or more predetermined thresholds within a predetermined time;
   responding to results of the comparison step:
      (i) falling outside a first predefined value set representing occupancy of a conference room, and
      (ii) falling outside a second predefined value set representing vacancy of the conference room,
   determining that the first sensor and the second sensor are insufficient to provide confirmed occupancy status information for the conference room and processing output from one or more image and/or video sensors to obtain confirmed occupancy status information for the conference room; and
   displaying the confirmed occupancy status information for the room on one or more user devices.

2. The method of claim 1, wherein the first and second output signals comprises voltage signals.

3. The method of claim 1, wherein the steps of monitoring, comparing, determining and processing is performed by a processing module.

4. The method of claim 1, wherein the steps of monitoring, comparing, determining, and processing is performed by a centralized application server.

5. The method of claim 1, wherein the step of comparing the first output signal and the second output signals with one or more predetermined thresholds comprises:
   determining if the first and second output signals exceed a first predetermined threshold; and
   determining, when the first and second signals exceed the first predetermined threshold, if the first and second output signals exceed a second predetermined threshold or if the first and second signal output signals are below a third predetermined threshold.

6. The method of claim 5, wherein the step of comparing the first output signal and the second output signals with one or more predetermined thresholds comprises:
   assigning a first value if the first and second output signal exceeds the second predetermined threshold;
   assigning a second value if the first and second output signals are below the third predetermined threshold; and
   assigning a third value if the first and second output signals neither exceed the second predetermined threshold nor are below the third predetermined threshold.

7. The method of claim 6, wherein the determining occupancy status information for the room comprises:
   determining if the first value and second value are identical and are non zero.

8. The method of claim 6, wherein further comprising:
   determining if the values assigned to both first and second sensors are a combination of first or second or third value, wherein the combination indicates uncertainty in detecting occupancy status.

9. The method of claim 1, wherein the predetermined time comprises at least one of: 5 minutes, 10 minutes and 15 minutes.

10. The method of claim 1, wherein the first sensor is a movement sensor.

11. The method of claim 1, wherein the second sensor is an acoustic sensor.

12. The method of claim 6, wherein the steps of processing output from the one or more image and/or video sensors to obtain occupancy status information for the room comprises:
   determining a base picture, wherein the base picture represents picture of an empty conference room;
   determining an uncertain picture, wherein the uncertain picture represents picture of the conference room when both the first and second output signals neither exceed the second predetermined threshold nor are below the third predetermined threshold;
   computing difference between the uncertain picture and base picture; and
   analyzing the computed difference for detecting presence of one or more users in the conference room to obtain occupancy status information.

13. The method of claim 3 further comprising the step of transmitting, by the processing module, the occupancy status information to a centralized application server for displaying the occupancy status information on the one or more user devices.

14. The method of claim 1 further comprising:
   monitoring output signals of light and temperature sensor; and
   comparing the output signals with corresponding predetermined thresholds to determine if the light and air-conditioner are switched 'on' or 'off'.

15. A system of detecting occupancy status of a plurality of conference rooms, the system comprising:
   a processing module configured to determine occupancy status information for a conference room, wherein the processing module is configured for:
      monitoring a first output signal of a first sensor; monitoring a second output signal of a second sensor;
      comparing the first output signal generating by the first sensor and the second output signal generated by the second sensor with one or more predetermined thresholds within a predetermined time; and
      responding to results of the comparison step:
         (i) falling outside a first predefined value set representing occupancy of a conference room, and
         (ii) falling outside a second predefined value set representing vacancy of the conference room,
      determining that the first sensor and the second sensor are insufficient to provide confirmed occupancy status information for the conference room and monitoring output from one or more image and/or video sensors located in the conference room to obtain confirmed occupancy status information for the conference room; and
   a centralized application server in communication with the processing module over a data communication network configured to receive the confirmed occupancy status information and update the confirmed occupancy status information for displaying on one or more user devices.

16. The system of claim 15 further comprises a coordinator node configured to transmit output signals of the first sensor device and the second sensor devices to the occupancy status processing module and further configured to transmit image and/or video output from the one or more image and/or video sensors to the processing module.

17. The system of claim 15, wherein the first sensor device and the second sensor devices comprises at least one of: movement sensor and acoustic sensor.

18. The system of claim 15, wherein the one or more image and/or video sensors comprises at least one of camera and any other video processing device.

19. The system of claim 15 further comprising at least one of:
light sensor and temperature sensor.

20. The system of claim 15, wherein the one or more user devices comprises remote computing devices communicatively coupled to the centralized application server.

21. The system of claim 15, wherein the data communication network comprises any one of: local area network, wide area network, metropolitan area network and wireless data communication network.

* * * * *